United States Patent [19]

Sobata et al.

[11] Patent Number: 4,853,285

[45] Date of Patent: Aug. 1, 1989

[54] CORROSION RESISTANT, COATED METAL LAMINATE, ITS PREPARATION AND COATING MATERIALS

[75] Inventors: Tamotsu Sobata; Masaaki Takimoto, both of Osaka; Yuichi Yoshida, Kyoto, all of Japan

[73] Assignee: Nippon Paint Co., Ltd., Osaka, Japan

[21] Appl. No.: 103,013

[22] Filed: Sep. 30, 1987

Related U.S. Application Data

[60] Division of Ser. No. 869,857, May 28, 1986, Pat. No. 4,719,038, which is a continuation-in-part of Ser. No. 687,004, Dec. 27, 1984, abandoned.

[30] Foreign Application Priority Data

Dec. 27, 1983 [JP] Japan ................................. 58-248312
Dec. 29, 1983 [JP] Japan ................................. 58-245747
Dec. 29, 1983 [JP] Japan ................................. 58-245748
Jan. 21, 1984 [JP] Japan ................................. 59-008678
Mar. 2, 1984 [JP] Japan ................................. 59-040874
Mar. 29, 1984 [JP] Japan ................................. 59-062555
Mar. 29, 1984 [JP] Japan ................................. 59-062556

[51] Int. Cl.$^4$ ...................... B32B 15/04; B32B 15/08; H01B 1/06

[52] U.S. Cl. ...................... 428/336; 252/511; 428/341; 428/457; 428/469; 428/484; 428/458.1

[58] Field of Search ................ 252/511, 519; 428/457, 428/469, 484, 488.1, 341, 336

[56] References Cited

U.S. PATENT DOCUMENTS

| | | | |
|---|---|---|---|
| 4,390,458 | 6/1983 | McKaveney | 252/519 X |
| 4,497,877 | 2/1985 | Krijl et al. | 428/457 X |
| 4,518,524 | 5/1985 | Stoetzer | 252/514 |
| 4,555,357 | 11/1985 | Kasuga et al. | 252/511 |
| 4,559,166 | 12/1985 | Morinaga et al. | 252/511 X |

Primary Examiner—Thomas J. Herbert
Attorney, Agent, or Firm—Wenderoth, Lind & Ponack

[57] ABSTRACT

Corrosive resistant, coated laminate consisting of metal substrate, anti-corrosive layer and paint layer, which is characterized by the fact that the anti-corrosive layer is formed by a composition containing, as essential components, at least one hexa-valent chromium containing chromium compound having a solubility of 20 to $10^{-5}$ and aqueous silica and/or aqueous resin as binder, and as optional component, a water soluble chromium compound having a solubility of more than 20, and the paint layer is free from chromium compound. The laminate is excellent, inter alia, in adhesion of coating and anti-corrosive property. The invention also provides a coated metal plate having excellent corrosion resistance and continuous spot weldability.

18 Claims, No Drawings

CORROSION RESISTANT, COATED METAL LAMINATE, ITS PREPARATION AND COATING MATERIALS

This application is a division of Ser. No. 869,857 filed May 28, 1986 now U.S. Pat. 4,719,038, which is a continuation-in-part of Ser. No. 687,004 filed Dec. 27, 1984, now abandoned.

FIELD OF INVENTION

The present invention relates to a laminate consisting of metal substrate, anti-corrosive layer and paint layer and being excellent in, inter alia, adhesion of coating and anti-corrosive property, and preparation thereof.

The invention also concerns a method for forming such anti-corrosive layer, materials to be used therefor and coating composition capable of resulting in a coating with excellent properties and especially continuous spot weldability.

BACKGROUND OF THE INVENTION

A metallic sheet such as zinc, iron and aluminium plates is usually applied with a coating from the esthetic and other functional points of view and often subjected to a pretreatment to improve adhesion of the coating and anti-corrosive property.

As the aforesaid pretreatment, there are such methods as phosphate treatment, chromate treatment, anodizing method and the like, and among them, particular attention is directed to the chromate treatment because a highly anti-corrosive coating can be obtained therewith.

Various proposals on this chromate pretreatment technique have been heretofore made for further improving the anti-corrosive property and adhesion of the coating.

These proposals include, for example, a technique for forming insoluble coating by controlling the ratio of hexavalent chromium to the total chromium in the chromate solution (e.g. Japanese Patent Publication No. 18217/64, ibid 37567/79), a technique for using, as binder, colloidal silica or water dispersible silica, in a coating type chromate composition to improve chromium pickup (e.g. Japanese Patent Application Kokai No. 10834/77, ibid 92339/78), a technique for using a water soluble or dispersible resin for the same purpose (e.g. Japanese Patent Application Kokai 30235/77, ibid 49029/78), a technique for adding phosphoric acid, fluorine salt or the like as reaction promotor (e.g. Japanese Patent Publication No. 26525/69, ibid 42135/77), a technique for adding salts of such metals as Ni, Co, Mn, Zn, Ba and the like as film modifier (e.g. Japanese Patent Application Kokai No. 105486/81, ibid 34178/83) or a technique wherein the metallic substrate is first treated with a chomate solution containing a reaction promotor and then with a coating type chromate liquid.

However, in these methods, there is indeed an increase in initial corrosion resistance, but none of the methods can solve the essential problems inherently possessed by the chromate coating, of degradation in corrosion resistance caused by thermal change or degradation in corrosion resistance with time due to the reaction between active chromium in the chromate coating and other constituents thereof.

On the other hand, compounding of anti-corrosive pigment such as solid chromate pigment, lead pigment and the like having comparatively lower solubility, to a coating composition for which a higher corrosion resistance is desired has been practiced under certain circumstances. However, there is a problem that chromium, lead and the like are liable to be dissolved out of the coating and hence the corrosion resistance be decreased with time.

Moreover, though it is not so serious as compared with the case of using water soluble chromium compound, such chromate pigment may react with other constituents of certain paints, and thus there are coatings and hence compositions which cannot include such chromate pigment. Even if a coating composition can stand such pigment, there exists a limit in the employable chromate pigments and in some cases, it will be essential to use a considerably larger quantity of pigment, and these facts will bring about additional, complicated and difficult problems in the combination of pigment and coating composition.

Under the circumstances, it would be an immeasurable advantage if a technique is established wherein a metal surface is effectively protected by a coating which is excellent in thermal resistance and is capable of fixing chromium compound on a metal surface that can never react with the coating resin and can exhibit excellent corrosion resistance for a longer duration of time, and on which any type of coating composition may be freely applied. The inventors having endeavored to find a good solution to this problem, have found an ideal, metal coating pre-treating composition comprising a hexa-valent chromium containing compound having a specified range of solubility, a specific type of binder and an optional water soluble chromium compound.

The invention has been made on the basis of this finding.

SUMMARY OF THE INVENTION

An object of the present invention is to provide a metal coating pre-treating composition capable of resulting in an anti-corrosive layer of zinc, iron or aluminium plate, which may improve adhesion of the coating, and is free from the degradation of corrosion resistance with time caused by change of properties under heating and/or reaction with paint resin.

Another object of the invention is to provide a metal coating pre-coating composition capable of resulting in an anti-corrosive coating on zinc, iron or aluminium plate, which may exhibit, even when applied with a coating composition containing no chromium or lead compound, excellent adhesion of coating and corrosion resistance. Other objects of the invention will be apparent to those skilled in the art from the following description of the invention and claims.

These and other objects of the invention can be attained with the present composition comprising at least one hexavalent chromium containg chromium compound having a solubility of 20 to $10^{-5}$ and compatible binder, the content of metal chromium being $10^{-1}$ to 100 g/l and the content of said binder being $10^{-2}$ to 500 g/l on solid basis.

In a particularly preferable embodiment, said composition may further include a water soluble chromium compound in an amount, in terms of metallic chromium, of $10^{-1}$ to 100 g/l.

The total amount of chromium compound(s), in terms of metallic chromium is more than 10%, and preferably more than 20% of the total non-volatile residue.

In this specification, the term "solubility" denotes "amount in grams of the compound dissovled in 100 grams of water at 20° C.".

PREFERRED EMBODIMENTS OF THE INVENTION

Hexa-valent chromium containing chromium compounds with solubility of 20 to $10^{-5}$ used in the present invention are exemplified by calcium chromate (typical member with a solubility of 20 to 10), zinc chromate and strontium chromate (typical members each having a solubility of 10 to $10^{-1}$), and barium chromate and lead chromate (typical members each having a solubility of $10^{-1}$ to $10^{-5}$).

The said compounds may include a mixture of hexa-valent chromium compound and other metal, or reaction product of hexa-valent chromium compound and an organic substance, providing it has solubility of 20 to $10^{-5}$.

Since a chromium compound having a solubility of more than 20 is excessively reactive to the resinous component of the coating, there is only insufficient corrosion resistance with time, of the coating. Whereas, with a chromium compound whose solubility is less than $10^{-5}$, the corrosion resistance is quite low and hence it is unable to attain the object of this invention.

Among the abovementioned chromium compounds, calcium chromate having a solubility of 20 to 10 is especially useful in giving a higher corrosion resistance with an active substrate, or in a slightly humid, corrosive atmosphere. However, there is shortcoming of lacking in durability of enhanced corrosion resistance. Though lead chromate, a typical member having a solubility of $10^{-1}$ to $10^{-5}$, is excellent in giving an enhanced corrosion resistance in a highly humid corrosive atmosphere, its activity is rather poor under a slightly humid condition. Whereas, such members as zinc potassium chromate, strontium chromate and the like do possess appropriate solubility, i.e. $10^{-1}$ to 10, and hence can exhibit excellent corrosion resistance under all corrosive circumstances, including highly corrosive circumstances. These chromium compounds may be used alone or in combination of 2 and more depending on the type of substrate material, coating composition and film performance required.

In the present pre-treatment composition, the abovesaid chromium compound should preferably exist in a range, as metallic chromium concentration, of $10^{-1}$ to 100 g/l. This is because at a level of less than $10^{-1}$ g/l, it is unable to attain the objects and effects of the present invention, and at a level of more than 100 g/l, stability of the pre-treatment composition will get worse. In the present invention, the abovesaid chromium compound is used together with the compatible binder. Such binders include aqueous silica, aqueous resin and the like.

Examples of aqueous silica are colloidal silica or water dispersible silica having a mean diameter of less than 100 m$\mu$. More specifically, mention is made of colloidal silica such as Snowtex O (colloidal silica, manufactured by Nissan Kagaku K.K., solid 20%, mean diameter 20 m$\mu$, pH 3.0), Snowtex N (pH 9), Snowtex OL (mean diameter 40 to 50 m$\mu$, pH 3), and as examples of water dispersible silica, there are Aerosil 300 (manufactured by Nippon Aerosil Co., mean diameter less than 100 m$\mu$), Aerosil TT-600 (manufactured by Nippon Aerosil Co., mean diameter 0.1 to 0.3m$\mu$), Imsil A 108 (manufactured by Illinois Mineral Co., mean diameter 5m$\mu$) and the like.

The abovementioned aqueous resin may include both water soluble and water dispersible resins having compatibility with the chromium compound.

Examples of water soluble resin are polyvinyl alcohol, alkyl hydroxy alkyl cellulose, polyacrylic acid and its derivative, polyvinylamide and its derivative, polyvinyl pyrrolidone, polyvinyl methylether, reaction product of maleic anhydride and vinyl or acryl compound and the like, and examples of water dispersible resin are alkyd resin, phenol resin, amino resin, vinyl acetate emulsion polymer, styrene butadiene series synthetic latex polymer, acrylic emulsion polymer, natural and synthetic rubber emulsion polymer and the like.

Such binders may be used alone or in combination of 2 and more and are useful in adhesively fixing the abovesaid chromium compound to the metal surface.

Among the abovesaid binders, much preference, is given to aqueous silica because of its capability of resulting in maximum corrosion resistance.

The binder component is advantageously selected in a range of $10^{-2}$ to 500 g/l on solid basis. In case of aqueous silica, it is preferably determined within said range, since at a lower level than $10^{-2}$ g/l, no satisfactory effect of the invention can be obtained and at a higher level than 500 g/l, no additional effect can be expected therewith. In the case of aqueous resin, it is preferably selected in a range of $10^{-1}$ to 50 g/l. This is because, at a lower level than the abovesaid lower limit, no satisfactory effect of the invention can be obtained and at a higher level than the abovesaid upper limit, there is a trend that stability of the composition will become worse.

The present pre-treatment composition is preferably adjusted to pH 1 to 10, because excessive metal dissolution is liable to occur at the time of film-forming if the pH is lower than 1, whereas there is an undesirable alkali corrosion of metal, if the pH is higher than 10, and in either case, no satisfactory effect of the invention can be expected. In order to adjust the pH of the pre-treatment composition, various inorganic or organic acids, and volatile bases such as ammonia water, amine and the like may be used.

The present pre-treatment composition may be applied in a usual way such as, for example, by dipping method, spray method and roll coating method, on zinc, iron or aluminium metal surface, and subjected, without water washing, to drying.

The drying conditions may be appropriately selected, providing the maximum metal surface temperature is limited to 60° to 200° C. As to the application amount of said pre-treatment composition, it is generally selected in a range of 0.05 to 5 g/m$^2$ as dried film weight. This is because, if the amount of said composition is less than the lower limit, no satisfactory corrosion resistance can be obtained and when the said amount is over the upper limit of 5 g/m$^2$, no additional effect can be expected.

As to the metal chromium content, it is preferred to be within a range of 0.01 to 1 g/m$^2$.

Thus obtained protecting film is stable against thermal degradation, shows excellent corrosion resistance, and can exhibit long-lasting anti-corrosion property because of no occurence of the reaction with resinous component of clear or upper coat.

The inventors have also found that a further improvement in both initial and successive corrosion resistance can be obtained when a water soluble chromium compound is added to the present pretreatment composition in an amount, in terms of metal chromium, of $10^{-1}$ to 100 g/l.

Therefore, in the most prefered embodiment of the present invention, there is provided a metal coating pre-treatment composition comprising $10^{-1}$ to 100 g/l (as metal chromium) of at least one hexa-valent chromium containing chromium compound having a solubility of 20 to $10^{-5}$, $10^{-1}$ to 100 g/l (as metal chromium ) of at least one water soluble chromium compound, the hexa-valent chromium being preferably more than 10% by weight of the total soluble chromium, and $10^{-2}$ to 500 g/l (on solid basis) of binder material which is compatible with chromium.

The term "water soluble chromium compound" denotes the chromium compound having a solubility of more than 20, and preferably more than 40.

The abovesaid water soluble chromium compound may be any such compound used in heretofore known chromate treating compositions, including $CrO_3$, $Cr(NO_3)_3.9H_2O$, $Cr_2(SO_4)_3.18H_2O$, and other various chromates or bichromates.

They are used alone or in combination of 2 or more. In this invention, such water soluble chromium compound is used in an amount of $10^{-1}$ to 100 g/l (on metal chromium basis), so as to give hexa-valent chromium of more than 10% by weight of the total water soluble chromium. This is because, at a lower level than $10^{-1}$ g/l, no satisfactory effect of water soluble chromium compound is obtained, whereas at a higher level than 100 g/l, no additional effect can be expected therewith. The amount of hexa-valent chromium in the total amount of water soluble chromium is also important, because at a lower level than 10% by weight, no appreciable improvement in corrosion resistance has been obtained. Preferably, the hexa-valent chromium should be 50 to 90% by weight of the total water soluble chromium. No additional effect can be expected by the increase in hexa-valent chromium content over 90% by weight. When use is made of the present pre-treatment composition containing a water soluble chromium compound, the amount of said water soluble chromium compound in the coating should preferably be in a range (as metal chromium) of 0.01 to 0.5 g/m² for the attainment of sufficient protecting effect and adhesion of the coating.

The present pre-treatment composition may further include, as reaction promoter, at least one of phosphoric acid, fluoric acid, fluosilicic acid, fluoboric acid, fluozirconic acid, fluotitanic acid and salts thereof, thereby increasing the protecting ability of chromate coating and corrosion resistance thereof.

Regarding the amount of said reaction promoter, it has been found that the most preferable range is about 5 to 20 g/l for phosphoric acid (phosphate), and about 0.03 to 10 g/l for fluoric acid, and complex fluoric acid (salts).

Thus treated metal substrate may be applied with any kind of paint compositions including clear coating. They may be of aqueous, solvent or powder type. The metal substrate may also advantageously by subjected to electrostatic coating or electrodeposition coating as desired.

Since there is no need of adding chromium pigment or the like to the top-coat composition, the resinous component and other ingredients may be freely selected for the said top-coat. When the pre-treatment composition includes water soluble chromium compound, even if there occurs certain reaction between the said chromium compound and coating resin, the composition likewise contains less reactive and less soluble chromium compound, which will give enough anti-corrosive effect and never flow out of the coating, and thus one may expect a long lasting corrosion resistance therewith.

The anti-corrosive coating laminate of the present invention consists, therefore, essentially of metal substrate with or without anti-corrosive chemical pretreatment, anti-corrosive layer of the composition comprising at least one hexa-valent chromium containing chromium compound having a solubility of 20 to $10^{-5}$, binder material composed of aqueous silica and/or aqueous resin, and optional water soluble chromium compound having a solubility of more than 20, and paint layer which is substantially free from chromium compound.

As already stated, any of the coating compositions may be freely used for the said paint layer and there is no need for adding chromate pigment or the like for anti-corrosive purpose, to the composition.

Among various coating compositions, particularly preferable are the compositions based on epoxy resin, vinyl butyral resin, oil-free polyester resin and/or carboxylated polyethylene resin, because their film-forming temperatures are relatively low and they are excellent in adhesion of the coating when applied with a top-coat.

The film thickness of the paint layer may be appropriately selected in a range of 1 to 10 μ.

In the abovesaid laminate, the anti-corrosive layer is expressed in terms of a single layer composed of the present pre-treatment composition.

However, when water soluble chromium compound is used as in the most preferable embodiment of the invention, the anti-corrosive layer may be composed of two separate sub-layers, and the water soluble chromium compound is preferably positioned in the inner sub-layer to minimize the flow-out of said compound and expect further improvement in corrosion resistance of the composite laminate.

Thus, in the present invention, there is provided a pre-coating treating method for a metal substrate comprising treating the substrate with a reaction type chromate treating agent containing water soluble chromium compound and a reaction promotor, subjecting the same to an optional washing and/or drying, contacting the substrate with a chromate solution containing hexa-valent chromium containing chromium compound having a solubility of 20 to $10^{-5}$ and aqueous silica and/or aqueous resin, and immediately drying the same.

The above said reaction type chromate treating composition and the treating method per se are conventional. As the water soluble chromium compound, mention is made of $CrO_3$, $Cr(NO_3)_3.9H_2O$, $Cr_2(SO_4)_3.18H_2O$, and other chromates and bichromates.

At least one of the said members is used in an amount of $10^{-1}$ to 100 g/l (as metal chromium) and hexa-valent chromium is preferably included in an amount corresponding to more than 10% by weight of the total soluble chromium.

Examples of reaction promotor are phosphoric acid (ca. 5 to 20 g/l), fluoric acid, fluosilicic acid, fluoboric acid, fluozirconic acid, fluotitanic acid and salts thereof (0.03 to 10 g/l in terms of F), sulfuric acid (ca. 0.1 to 10 g/l), hydrochloric acid (ca. 0.1 to 10 g/l) and the like.

Degreased and cleaned metal substrate is first contacted with the said reaction type chromate liquid by spraying, dipping or the like.

The amount of the chromate coating applied is usually selected in a range of 10 to 250 mg $Cr/m^2$. If the chromium coverage is less than 10 $mg/m^2$, no sufficient effect of the invention can be attained and if it is over the upper limit of 250 $mg/m^2$, adhesion of the coating will be lowered.

The bath temperature is usually fixed in a range of room temperature to 50° C., and treating time is set in a range of 1 to 30 seconds.

If necessary, thus treated substrate is washed with water and dried. When dry off is required, it is carried out at a plate temperature of 50° to 100° C.

Thus treated metal substrate is then treated with a chromate solution containing hexa-valent chromium containing chromium compound having a solubility of 20 to $10^{-5}$ and aqueous silica and/or aqueous resin.

The said chromium compound and binder material have already been described above.

In this chromate solution, the content of said chromium compound should preferably be in a range of $10^{-1}$ to 100 g/l as metal chromium. This is because, if it is less than $10^{-1}$ Cr g/l, it is too thin for the object of this invention and in a usual application method and amount, the intended object and effect of the invention cannot be attained therewith. On the other hand, if it is over the upper limit of 100 g/l, the stability of the treating composition per se will get worse. The binder content is preferably selected in a range of $10^{-2}$ to 500 g/l (on solid basis), and the pH of the solution is determined in a range of 1 to 10, as already stated above.

The chromate solution is applied so as to give a dried film weight of 0.05 to 5 $g/m^2$, the chromium coverage, in terms of metal chromium, being 0.01 g to 1 $g/m^2$.

If desired, said chromium solution may further include water soluble chromium compound in an amount of $10^{-1}$ to 100 g/l as metal chromium, and reaction promotor as stated hereinbefore. By the adoption of this treating method, a further improved anti-corrosive layer can be obtained.

Alternatively, an excellent anti-corrosive layer of this invention may be prepared by the method wherein a metal substrate is contacted with a chromate solution containing a water soluble chromium compound having a solubility of more than 20 and aqueous silica and/or aqueous resin, and, after drying the same, contacted with a chromate solution containing hexa-valent chromium containing compound having a solubility of 20 to $10^{-5}$, and aqueous silica and/or aqueous resin, and subjected to drying. In this method, each chromate solution is formulated so as to contain the defined chromium compound in an amount corresponding to $10^{-1}$ to 100 g Cr/l and aqueous silica and/or aqueous resin in an amount of $10^{-2}$ to 500 g/l on solid basis.

The chromate solution used in the second state is adjusted to pH 1 to 10 and may be added with water soluble chromate compound and reaction promotor, if desired.

The chromium coverage in each layer and application of the respective chromate solution are almost identical with those of the method previously mentioned.

By the adoption of this method, an excellent anti-corrosive layer can be provided on a metal substrate.

Thus, the anti-corrosive layer may be composed of a single layer or of two separate sub-layers, and therefore, in the present invention, unless otherwise stated, the term "anti-corrosive layer" should be understood as including all of the abovementioned layers.

The present object of providing a composite laminate consisting essentially of Zn, Fe or Al base plate, an anti-corrosive layer, and a paint layer free from chromium or lead compound, and being excellent in adhesion of coating and corrosion resistance both in initial and successive stages, can be fully attained with the disclosed techniques.

A coated metal plate can be used in various technical fields. Among them, the most important and attractive one is in the automobile industry.

In industrial production of automobile bodies or the like, the respective body portions such as, for example, locker panel, door, fender and the like, are prepared from steel panel by pressing, fabricated by spot welding and thereafter, degreased, treated by phosphating process and finally subjected to an electro deposition coating.

Therefore, these panels are required to be excellent in processability, spot-weldability, adhesion of electodeposited coating and corrosion resistance.

For spot-weldability, it is necessary to give electrical conductivity to the coating, and for this purpose, the so-called conductive pigment is included in the coating.

However, in the actual production line of such automobile bodies where a large quantity of materials are to be handled at higher speed with the least number of operators, continuous spot weldability is an important problem for the art to solve. Incidentally, continuous spot weldability is evaluated by the number of weldings made before the cleaning or exchange of electrode is necessitated.

In the technique wherein electrical conductivity is given to the coating by the inclusion of conductive pigment therein (e.g. Japanese Patent Publication No. 44569/77, Japanese Patent Application Kokai No. 138758/83, ibid 174582/83) or the technique wherein the conductivity of the coating is further increased by exerting ingenuity in terms of the employed pigment (e.g. Japanese Patent Application Kokai No. 79138/76, Japanese Patent Publication 19706/83), it is indeed possible to carry out a certain number of spot-weldings, but they cannot stand continuous welding of 2000 spots and more, because no thoughtful consideration is given to contamination of electrode. Nevertheless, in the latest, automobile production line, it is often desired to carry out a continuous spot-welding of 2000 to 5000 spots and more. On the other hand, in the pressing or deep draw processing of the coated material, it is undesired that the coating peels off in powdery form, adheres to the press, thereby causing processing marks or increasing the frequency of cleaning of the press, or the coating peels off from the substrate or develops cracks, thereby decreasing corrosion resistance on that part.

For the purpose of improving processability of the coating, there has been known the addition of inorganic or organic lubricant to the coating composition.

However, a weldable coating is often formulated rich in pigment for attainment of electrical conductivity of the coating, and when such inorganic pigments as molybdenum disulfide, carbon or lead oxide are compounded with the coating composition in enough quantity to exert full function thereof, additional problems of lowering the strength of the coating and lowering processability necessarily occur.

In general, with a coating composition containing relatively large quantity of conductive pigment or lubricant, there is a trend that corrosion resistance of the coating is lowered. Since some conductive pigments, by themselves or after being decomposed, may exert corrosion promoting effects, careful selection of such pigments and their conditions of use are, in fact, very important for the obtainmnet of highly anti-corrosive coating.

Thus, in the related field, there has long been desired to have a coated metal laminate having excellent processability, corrosion resistance, and continuous spot-weldability.

The coated metal plate should preferably have additional chracteristics of being excellent in adhesion of finish coating like elctro-deposition coating, and corrosion resistance even at the imperfectly coated area.

The present inventors, having these considerations in mind, have diligently studied the correlation between the continuous spot-weldability and composition of the coating and have foud that thermal decomposition of the binder resin in the coating is greatly concerned in the continuous spot-weldability, said thermal decomposition of the binder resin is greatly influenced by the aromatic ring content of the resinous molecule and by the presence or absence of easily decomposable material in the resin, and continuous spot-weldability can be markedly improved by limiting the aromatic ring content of the binder resin in a certain range and compounding an appropriate amount of thermally decomposable material in the coating composition.

As to the improvement in processability of the coated panel, the inventors have found that addition of organic lubricant can give a good solution to this problem and that such organic lubricant may also function as the abovesaid thermally decomposable material. The required anti-corrosive property and adhesion of coating might be successfully attained by the adoption of anti-corrosive layer hereinbefore stated.

On the basis of these findings, the inventors have succeeded in providing a coated metal panel which is excellent in weldability, processability and corrosion resistance and is especially useful for the production of automobile bodies and the like in a commercial line.

Thus, in this aspect of the invention, there is provided an anti-corrosive, coated metal panel consisting essentially of metal substrate with or without anti-corrosive chemical pre-treatment, and anti-corrosive layer of the composition comprising at least one hexa-valent chromium containing chromium compound having a solubility of 20 to $10^{-5}$, binder material composed of aqueous silica and/or aqueous resin and optional water soluble chromium compound, and an electrically conductive coating layer, which is characterized by the fact that said coating layer is formed by applying either one of the following:

(A) a composition comprising 10 to 35% by weight of binder resin whose aromatic ring content in the molecule is 0 to 50% by weight, 3 to 50% by weight of polyethylene wax, and 15 to 86% by weight of electrically conductive pigment, or (B) a composition comprising 10 to 35% by weight of binder resin whose aromatic ring content in the molecule is 0 to 50% by weight, 4 to 30% by weight of polyethylene wax, 15 to 85% by weight of electrically conductive pigment essentially of di-iron phosphide, 1 to 71% by weight of iron phosphide decomposition inhibitor, and 0 to 70% by weight of other inorganic pigment, provided that the total quantity of electrically conductive pigment, iron phosphide decomposition inhibitor and other inorganic pigment is 35 to 86% by weight.

Thus, in the first instance, the coating layer is fomed by a coating composition comprising, as solid, 10 to 35% by weight of at least one binder resin having zero or less than 50% by weight of aromatic ring content, 4 to 50% by weight of polyethylene wax, and 15 to 98% by weight of electrically conductive pigment. The resinous component used in the abovesaid coating composition may be any binder resin whose aromatic ring content in the molecule is 0 or 50% by weight at the most.

Examples of such resin are epoxy resin, alkyd resin, acryl resin, melamine resin, urethane resin, phenol resin, vinyl resin, polyvinyl butyral resin, polyvinyl acetate resin, chlorinated rubber, oil-free polyester resin, phthalic acid resin, styrene resin, polyolefin resin and the like. They may be used either in organic solvent type or in aqueous type.

They are used alone or in combination form, and however, even in the latter case, the aromatic ring content should be, as expressed in terms of average content, less than 50% by weight and most preferably 0%.

The inventors have found that the aromatic ring content of the resinous molecule has a close connection with the aforesaid continuous spot weldability and when the aromatic ring content exceed 50% by weight, the hereinunder defined thermal decomposition rate is extremely low:

$$\text{thermal decomposition rate} = 1 - \frac{\text{resinous weight after heating}}{\text{resinous weight before heating}}$$

heating condition: 5 to 10 mg of sample resin is heated from room temperature to 550° C. at a rate of 20° C./min in $N_2$ atmosphere; and resinous weight after heating: when the sample resin reaches 550° C., the resinous weight is determined by thermogravimetric analysis. Further, continuous spot-weldability will also become extremely low in proportion therewith. However, when the aromatic ring content is 0 to 50% by weight, the weight decreasing rate by thermal decomposition of resin is in the order of 70 to 100%, and such material can well stand continuous spot-welding of up to 5000 spots.

The resinous content in the coating composition is usually determined in a range of 10 to 35% by weight and preferably 15 to 25% by weight.

If the resinous content is below the lower limit of 10% by weight, there is a trend that processability will become markedly decreased, and if the resinous content exceeds 35% by weight, there is a lowering of continuous spot-weldability.

The polyethylene wax used in the present coating composition is in the form of powder having a mean diameter of less than 50 microns. The polyethylene should preferably have a molecular weight of 1,000 to 10,000. Preferred examples are Ceridust 3620 (finely powdered polyethylene wax, specific gravity of at least 0.94, acid value of not more than 15 KOH mg/g, trade mark of Hoechst AG) and the like. The polyethylene wax is usually added in an amount corresponding to 4 to 50% by weight, preferably 4 to 30% by weight and most preferably 4 to 20% by weight of the total solids of the coating composition.

If the said amount is lower than 4% by weight, there is a decrease in processability and no thermal decomposition promoting activity toward the resin, whereas if it exceeds 30% by weight, there is no further improvement in processability but rather decrease in corrosion resistance of the coating. However, said decrease in corrosion resistance is to a tolerable extent at the polyethylene wax levels of 30 to 50% by weight.

In the abovesaid coating composition, there is an inorganic pigment known as electrically conductive pigment.

Examples of such inorganic pigments are metal powders such as stainless steel, gold, silver, cadmium, aluminium, zinc, tin, copper, and graphite-powders; metal carbides such as iron, nickel, titanium, tungsten, niobium and manganese carbides; and ferro alloys such as ferromanganese, ferromolybdenum, ferrosilicon, ferrochromium, ferrotitanium, ferrophosphor and the like. They are used in pulverized form with a mean diameter of less than $20\mu$, and preferably less than $10\mu$.

The inorganic pigments are never limited to the above and any of the electrically conductive pigments known in the art may be satisfactorily used providing they give the lease affect on corrosion resistance and processability of the coated plate. For example, in the combination of steel plate and metallic powder, it is preferred to exclude such metallic powder as having noble electrode potential as compared with iron electrode potential. Also, it is prefered to use such electrically conductive pigment as having a low, stable electric resistance, not being fused at the time of welding, thereby showing no decrease in electric current density and no contamination of electrode at that time, and having enough hardness to resist crushing under welding pressure.

Since the pigment is used in comparatively larger quantity, it is of course desired to be supplied at a lower price. From this standpoint, especially advantageous pigments are iron carbide and iron phosphide.

The electrically conductive pigment is usually employed in an amount of 15 to 86% by weight, preferably 30 to 70% by weight, of the total solid of the coating composition. If the pigment amount is below the lower limit of 30% by weight, there are cases showing shortage of the desired electric conductivity at the film thickness of more than $10\mu$, and when the pigment is lower than 15% by weight, it is unable to carry out spot-weldings because of the clear shortage of electric conductivity of the coating. Whereas, when the pigment amount is over 70% by weight, there are cases wherein the processability wll get worse, and at the level of over 86% by weight, there is a clear deterioration of processability of the coated product.

In the present composition, other inorganic pigments such as, for example, chromium pigments (zinc chromate, lead chromate, calcium chromate, strontium chromate pigments), phosphate pigments (zinc phosphate, iron phosphate, aluminium tripolyphosphate pigments) and lead compound pigments (lead silicate and the like) for the purpose of increasing corrosion resistance; body pigments (silica, calcium carbonate, talc, alumina and the like) for the purpose of adjusting resinous content or coating pH; and coloring pigments (chromium oxide, iron oxide, lead oxide and the like) may be added if desired. This type of coating composition may be prepared by blending the abovesaid components in a usual way. That is, the resin is first dissolved in a solvent. To a part of said resinous solution, are added electrically conductive pigment and other optional inorganic pigment and the mixture is dispersed well by using triple roll mill, sand grind mill, ball mill, disolver and other known coating use dispersing means. To this, are added the remaining amount of resinous solution and polyethylene wax and the mixture is uniformly mixed and if desired, subjected to dispersing operation again to obtain a coating composition. Though the solid content may vary with the coating method used, it is generally in a range of 10 to 70% by weight. Of course, other techniques may be used for the preparation of such coating composition and other additives may be added if desired. In the preparation of said coating composition, any of the conventional coating use solvents may be employed as, for example, xylene, toluene, mineral spirits, methanol, ethanol, butanol, isopropanol, methyl ethyl ketone, ethyl butyl ketone, methyl isobutyl ketone, ethyleneglycol monobutyl ether, ethyleneglycol monoethyl ether, ethyleneglycol monoethyl acetate, ethyl acetate, butyl acetate, cyclohexanone, water and the like. The abovesaid coating composition may be applied by using a conventional means on various metallic materials such as cold-rolled steel plate, galvanized steel, zinc alloy plated sheet steel, aluminium plated steel, zinc and zinc alloy sheet, aluminium and aluminium alloy sheet, stainless steel, and various other steel plates. When the metallic substrate is contaminated with oil and other materials, it is first degreased by washing with an alkalidegreasing agent or organic solvent. If desired, thus treated substrate is washed with water and then subjected to a conventional chemical treatment to form phosphate coating or chromate coating thereupon, washed and dried. Thus treated substrate material is then applied with the present anticorrosive layer and then with the abovesaid coating to obtain an anti-corrosive, coated metal plate, which is excellent in processability, corrosion resistance and continuous spotweldability. The said coating layer is usually applied in 1 in 20 microns, preferably 2 to 10 microns, dry thickness, and the baking conditions are usually set at 100° to 300° C. plate maximum temperature and 30 sec. to 2 min. baking time.

In the second instance, the coating layer is formed by using a coating composition comprising, as solid, 10 to 35% by weight of binder resin whose aromatic ring content is 0 to 50% by weight, 4 to 30% by weight of polyethylene wax, 15 to 85% by weight of electrically conductive pigment essentially of diiron phosphide, 1 to 71% by weight of iron phosphide decomposition inhibitor, and 0 to 70% by weight of other inorganic pigment, provided that the total quantity of said electrically conductive pigment, iron phosphide decomposition inhibitor and other optional pigment is 35 to 86% by weight.

In this composition, as the resinous component and the polyethylene wax, the same members as stated in connection with the aforesaid first instance and used in the indicated amounts. The electrically conductive pigment to be added for the purpose of giving electric conductivity to the coating is specifically limited to the pigment composed essentially of iron phosphide ($Fe_2P$) with a mean diameter of less than 20 microns and most preferably less than 10 microns. This type of electrically conductive pigment is prominent among others because of having a low, stable electric resistance, not being fused at the time of welding, thereby showing no decrease in electric current density and no contamination of the electrode, having the desired hardness to resist crushing, being inexpensive and supplied in larger quantity, and being inert and excellent in anti-corrosive property. Various products are marketed under the names of Ferrofos and the like and they are used alone or in combination form. Though the selected pigments are the best materials among the known electrically conductive pigments, it has been found that under specific corrosive circumstances such as an acidic atmosphere, iron phosphide may be decomposed and corrosion will be promoted by the said decomposed substances.

It depends on the coating composition, substrate metal and corrosive environmental conditions as to whether the coating is brought under an acidic atmosphere or not. However, nothing could surpass a composition that would give excellent corrosion resistance under severe tests such as composite corrosion tests with several corrosive environments, or alternate wet and dry conditions. The inventors have found that in order to obtain such composition, it is essential to control the decomposition of iron phosphide or to make the decomposed products harmless, and for this purpose, employment of certain type of pigment whose aqueous suspension will show pH 6 to 13, preferably 7 to 11, can provide a very effective solution, because it is effective to maintain the coating always under neutral to alkaline condition.

Therefore, in this aspect of the invention, the coating composition contains as essential ingredients, iron phosphide decomposition inhibitor, together with an electrically conductive pigment composed essentially of iron phosphide.

As already stated, the only role of this inhibitor is to bring the coating always under neutral or alkaline condition and any pigment whose aqueous suspension shows pH 6 to 13 may be satisfactorily used for this end. Examples of such pigment are:

(1) alkaline earth metal petroleum sulfonate, (2) chromate pigments such as zinc chromate, zinc potassium chromate, lead chromate, basic lead chromate, calcium chromate and strontium chromate, (3) phosphate pigments such as zinc phosphate, iron phosphate, and aluminium tripolyphosphate, (4) lead compound pigments such as lead silicate, (5) body pigments such as talc, calcium carbonate and silica, and (6) zinc powder (less than the iron phosphide amount).

Incidentally, the amount of this type of pigment should preferably be more than 1% by weight of the total solid of the coating composition, but less than the hereinafter stated total amount of inorganic pigments.

They are sometimes classified as anti-corrosive pigment or body pigment, but, in this invention, are recognized as iron phosphide decomposition inhibitor because of having the defined aqueous suspension pH.

In this type of coating composition, other inorganic pigments for the purpose of improving corrosion resistance, control of resinous content, pH control, coloring and the like may be added if desired. As to the details of these pigments, reference should be made to the preceding coating composition.

However, in this aspect of the invention, the total quantity of electrically conductive pigment composed essentially of iron phosphide, iron phosphide decomposition inhibitor and other optional inorganic pigment should be in a range of 35 to 86% by weight, preferably 35 to 70% by weight of the coating solid. This is because, if the total amount of said pigments is less than 35% by weight, there is a decrease in processability and even at the level of more than 70% by weight, there is the case wherein the processability will be somewhat decreased. When it exceeds the upper limit of 86% by weight, there is a marked decrease in processability.

In formulating the coating composition, the selected resin is first dissolved in a solvent. To a part of said resinous solution, are added electrically conductive pigment composed essentially of di-iron phosphide, iron phosphide decomposition inhibitor and other optional inorganic pigment if any, and the mixture is dispersed well. Next, the remaining amount of the resinous solution and polyethylene wax are added and mixed well to obtain a coating composition. The solid content may be controlled to 10 to 70% by weight, though it may vary in wide range depending on the coating method, coating object or the like. To this composition, other conventional additives may be added if desired. By the use of this coating composition, together with the present anti-corrosive layer, it is possible to obtain a very attractive coated metal plate having improved processability, anti-corrosive property and particularly excellent continuous spot-weldability.

The invention shall be now more fully explained in the following Examples. Unless otherwise stated, all parts and percentages are by weight.

EXAMPLE 1

(1) metal substrate

Hot dip alloy-galvanized sheet steel (60/60 oiling) was treated with alkali-degreasing agent (Ridoline 75, manufactured by Nippon Paint Co.)

(2) pre-treating liquids

1st stage liquid (reaction type chromate treating agent)

| | | |
|---|---|---|
| chromium trioxide | 12 g/l | (in terms of metallic chromium) |
| phosphoric acid | 10 g/l | (in terms of non-volatile content) |
| water | | |
| 2nd stage liq. (chromate liq.) | | |
| zinc potassium chromate (water solubility 6 to 8) | 15 g/l | (in terms of metallic chromium) |
| Snowtex N | 15 g/l | (in terms of non-volatile content) |
| water | | |

Each liquid was prepared by mixing the indicated components and subjecting the same to a glass bead dispersion in a paint shaker for 1 hour.

(3) pre-treatment

The degreased metal substrate was dipped in the abovesaid 1st stage liquid at 50° C. for 10 sec., dried in hot air, coated with the 2nd stage liquid by a bar coater (#3) at room temperature, and without washing, dried at 100° C. (maximum plate temperature 100° C.) for 1 min.

(4) paint

Urethane modified epoxy resin base clear paint (solvent type).

(5) coating method

The abovesaid pre-treated steel plate was coated with the said paint by a bar coater and baked at 200° C. for 1 min. (maximum plate temperature 200° C.). The dry thickness of the coating was 2μ.

EXAMPLE 2

Similar experiment was carried out as in Example 1 excepting using the chromate liquids as shown in Table 1.

EXAMPLE 3

(1) metal substrate

Electroplated galvanized sheet iron was degreased with an alkali-degreasing agent Ridoline 155 (manufactured by Nippon Paint Co., Ltd.)

(2) pre-treating liquid (reaction type chromate solution)

Granodine 92 (Nippon Paint Co., Ltd.) added with hydrochloric acid (reaction promotor) was used.

(3) pre-treatment

The degreased metal substrate was dipped in 3% (v/v) aqueous Granodine 92 (Nippon Paint Co., Ltd.) solution at 40° C. for 10 sec., washed with water, washed with hot water, and dried in hot air. Thus treated substrate material was then treated with the 2nd stage chromate liquid shown in Table 1 as in Example 1.

EXAMPLE 4

Electroplated galvanized sheet iron was spray-treated with a degreasing, reaction type chromate treating agent of the following composition at 50° C. for 10 sec., washed with water, water drained, dried and treated thereafter as in Example 2.

Reaction type chromate treating liquid:

| | |
|---|---|
| 30% reduced chromium trioxide* | 7 g/l (as Cr) |
| sulfuric acid | 5 g/l (as non-volatile) |
| polyacrylic acid | 1 g/l (as non-volatile) |
| Adekanol LO-7 | 0.5 g/l (as non-volatile) |
| Adekanol B 2020 (nonionic surfactant, manufactured by Asahi denka K.K.) | 0.5 g/l (as non-volatile) |

*aq. $CrO_3$ solution was reduced by formalin

Comparative Examples 1 to 2
The comparative samples were prepared as in Examples by using the prescriptions given in Table 1.

TABLE 1

| Example | 1 | 2 | 3 |
|---|---|---|---|
| Substrate (plated steel) | hot dip alloy galvanized | hot dip alloy galvanized | zinc electroplated |
| 1st stage chromate | chromium trioxide $CrO_3$ | $CrO_3$ | Giranodine |
| chromium compound | Cr 12 g/l | Cr 7 g/l | |
| reaction promoter | phosphoric acid 10 g/l | potassium fluotitanate | hydrochloric acid |
| washing with water | no | no | yes |
| drying | PMT 50° C. | PMT 50° C. | PMT 50° C. |
| total Cr (1st stage Cr-coverage) | 50 mg/m² | 30 mg/m² | 100 mg/m² |
| 2nd stage chromate | ZPC | ZPC | ZPC |
| $A_1$ chromium content | Cr 15 g/l | Cr 15 g/l | Cr 5 g/l |
| $A_2$ chromium content * | — | I $Cr^{6+}$ 90% total Cr 20 g/l | — |
| binder** | II NV 15 g/l | III NV 15 g/l | II NV 15 g/l |
| drying | PMT 100° C. × 1 min. | PMT 100° C. × 1 min. | PMT 100° C. × 1 min. |
| composite coat. total Cr | 110 mg/m² | 170 mg/m² | 120 mg/m² |
| $A_1$ chromium | 60 mg/m² | 60 mg/m² | 20 mg/m² |
| painting*** | V 2μ PMT 200° C. 1 min. | V 2μ PMT 200° C. 1 min. | V 2μ PMT 200° C. 1 min. |
| salt spray test initial**** | 1200 H | 1500 H | 1500 H |
| successive**** | 1200 H | 1500 H | 1500 H |

| Example | Com. Ex. 1 | Comp. Ex. 2 | 4 |
|---|---|---|---|
| Substrate (plated steel) | hot dip alloy galvanized | hot dip alloy galvanized | zinc electroplated |
| 1st stage chromate | $CrO_3$ | $CrO_3$ | $CrO_3$ |
| chromium compound | Cr 20 g/l | Cr 20 g/l | 30% red. 7 g/l |
| reaction promoter | phosphoric acid 10 g/l | phosphoric acid 10 g/l | surfactant/ sulfuric acid |
| washing with water | no | no | yes |
| drying | PMT 50° C. | PMT 50° C. | PMT 50° C. |
| total Cr (1st stage Cr-coverage) | 80 mg/m² | 80 mg/m² | 30 mg/m² |
| 2nd stage chromate | | | ZPC |
| $A_1$ chromium content | | | Cr 15 g/l |
| $A_2$ chromium content * | | I Cr 20 g/l | $Cr^{6+}$ 70% total Cr 20 g/l |
| binder** | | II NV 15 g/l | III NV 15 g/l |
| drying | | PMT 100° C. × 1 min. | PMT 100° C. × 1 min. |
| composite coat. total Cr | 80 mg/m² | 160 mg/m² | 170 mg/m² |
| $A_1$ chromium | | | 60 mg/m² |
| painting*** | V 2μ PMT 200° C. 1 min. | V 2μ PMT 200° C. 1 min. | V 2μ PMT 200° C. 1 min. |
| salt spray test initial**** | 200 H | 1000 H | 1200 H |

TABLE 1-continued

| | | | |
|---|---|---|---|
| successive**** | 72 H | 200 H | 1200 H |

*I chromium trioxide was partially reduced with formalin
**II Snowtex N; III Aerosil 300
***V urethane modified epoxy resin clear
****generation of white rust
PMT peak metal temperature
ZPC zinc potassium chromate

EXAMPLE 5

Electroplated galvanized sheet iron was coated by a bar coater with the 1st stage chromate liquid ($a_1$) shown in Table 2 in an amount of 4 ml/m$^2$, and without washing, subjected to drying (maximum plate temperature 100° C.) for 1 minute.

Next, the 2nd stage chromate liquid ($b_1$) was applied as in the first stage coating, and dried.

Thereafter, epoxy base clear coating was coated in dry thickness of 2μ.

The anti-corrosive property was evaluated by using salt spray method and counting the time up to white rust generation. The test was conducted at the time of just after the coating and after being kept at room temperature for 2 months. The test results are shown in Table 2.

EXAMPLE 6 AND COMPARATIVE EXAMPLE 3 AND 4

Similar coated plates were prepared using the method of Ex. 5 but substituting the chromate liquids shown in Table 2 and 3 for that of Ex. 5.

Incidentally, in the following Tables 2 and 3, the following were used as chromium compounds:
zinc potassium chromate having a solubility of 6 and 8 and
strontium chromate having a solubility of $10^{-1}$.

EXAMPLE 7

Zinc potassium chromate having a solubility of 6 and 8 (15g as metallic chromium), polyacrylic acid Jurymer AC-10L (manufactured by Nihon Junyaku K.K., 10g as solid) and water (to make the total volume to 1 l) were compounded and subjected to a glass bead dispersion in a paint shaker for 1 hour, and adjusted to pH 2 to obtain a metal coating pre-treating agent.

EXAMPLES 8 AND 17 AND COMPARATIVE EXAMPLES 5 TO 6

Using the method of Example 7, but following the prescriptions givin in the Table 4, the respective pre-treating agents were obtained.

For the adjustment of pH to an acidic side, acetic acid was used and to an alkali side, ammonia water.

In Example 15, pH was adjusted to 9 and in other Examples and Comparative Examples adjusted to 2.

In Example 16, 7 g/l of phosphoric acid was added as a reaction promotor.

The abovementioned treating agents were each applied by roll-coat technique to electroplated galvanized steel sheet (Examples 7 to 16 and Comparative Examples 5 to 6) or hot dip alloy-galvanized sheet iron (Example 17) previously degreased with an alkali degreasing agent (Ridoline 155, manufactured by Nippon Paint Co., Ltd.), dried, applied with a clear paint in a dry

TABLE 2

| | chromate solutions | | | | |
|---|---|---|---|---|---|
| | $a_1$ | $a_2$ | $a_3$ | $b_1$ | $b_2$ |
| $A_1$ chromium Cr concent. | no | no | no | strontium chromate 15 g/l | zinc potassium chromate(ZPC) 3 g/l |
| $A_2$ chromium Cr concent. $Cr^{6+}$/total Cr | chromium trioxide (CrO$_3$) formalin reduc. Cr 20 g/l 70% | CrO$_3$ formalin reduc. Cr 40 g/l 70% | CrO$_3$ formalin reduc. Cr 20 g/l 70% | no | CrO$_3$ formalin reduc. Cr 10 g/l 70% |
| B-binder as NV | Aerosil 300 15 g/l | Aerosil 300 30 g/l | Jurymer AC-10L 10 g/l | Snowtex N 15 g/l | Jurymer AC-10L 7 g/l |
| pH | 2 | 2 | 2 | 9 | 2 |

Jurymer AC-10 L (polyacrylic acid, manufactured by Nihon Junyaku K.K.)
b liquid aqueous dispersion was subjected to a glass bead dispersion in paint shaker for 1 hour

TABLE 3

| Example | 5 | 6 | Comp. Ex. 3 | Comp. Ex. 4 |
|---|---|---|---|---|
| 1st stage liquid | $a_1$ | $a_1$ | $a_2$ | $a_1$ |
| coating $A_1$ Cr mg/m$^2$ | 0 | 0 | 0 | 0 |
| $A_2$ Cr mg/m$^2$ | 80 | 80 | 160 | 80 |
| 2nd stage liquid | $b_1$ | $b_2$ | no | $a_3$ |
| Composit coating | | | | |
| total Cr mg/m$^2$ | 140 | 132 | 160 | 160 |
| $A_1$-Cr mg/m$^2$ | 60 | 12 | 0 | 0 |
| Evaluation | | | | |
| initial anticorrosion | 1000 H | 800 H | 700 H | 700 H |
| successive anticorrosion | 1000 H | 800 H | 200 H | 200 H | thickness of 2μ, and dried by applying heat. The coating amounts of treating agents on the steel sheets were each controlled to 4 ml/m$^2$. With these coated plates, chromium flow-out and anti-corrosive properties were examined.

In these examples, solvent type urethane modified epoxy resin was used as clear paint, but in Example 17, an aqueous carboxylated polyethylene resin clear paint was used.

Anti-corrosive property was evaluated by using salt-spray method and measuring the time until white rust will come out with the sample just prepared and the sample maintained at room temperature for two months. The test results are shown in Table 4.

The chromium flow-out was evaluated by using the sample whose back and edge portions were sealed, dipping it in a pure water at 40° C. for 72 hours, measuring the chromium amount adhered on the surface by fluorescent X-ray analysis, and calculating the chromium flow-out. In none of the plates of Examples 7 and 17 and Comparative Examples 5 and 6, was chromium flow-out detected. In these examples and Comparative Examples, the following were used:
zinc potassium chromate having a solubility of 6 to 8, calcium chromate having a solubility of 14,
lead chromate having a solubility of $10^{-4}$, and
sodium chromate having a solubility of 64.

EXAMPLES 19 TO 21 AND COMPARATIVE EXAMPLES 7 TO 9

Using the same method as stated in Example 18, but following the prescriptions given in Table 5, the respective pre-treating agents were obtained.

For the purpose of adjustmnet of pH to an acidic side, acetic acid was used and to an alkali side, an ammonia water.

The respective pre-treating agents were applied by roll-coat technique onto electroplated galvanized steel sheet, dried, applied with a clear paint in a dry thickness of 2μ, and dried under heating.

The chromium flow-out and anti-corrosive properties were examined.

The following standards were used for the evaluation of chromium flow-out.

5O1 : no flowing out
Δ : flow-out to the extent of less than 5 mg/m²
X : flow-out to the extent of more than 5 mg/m²

TABLE 4

| | metal coating pretreating agents | | | |
|---|---|---|---|---|
| Example | 7 | 8 | Comparative 5 | 9 |
| chromate liq. A₁ chromium | zinc potassium chromate (ZPC) | ZPC | no | calcium chromate |
| Cr conc. | Cr 15 g/l | Cr 15 g/l | | Cr 15 g/l |
| A₂ chromium | | chromium trioxide formalin reduction | chromium trioxide formalin reduction | chromium trioxide formalin reduction |
| | no | Cr 20 g/l | Cr 30 g/l | Cr 20 g/l |
| Cr⁶⁺/total Cr | | 70% | 70% | 70% |
| B-binder | polyacrylic acid Jurymer AC-10L. | Aerosil 300 | Aerosil 300 | Aerosil 300 |
| as NV | 10 g/l | 15 g/l | 23 g/l | 15 g/l |
| Evaluation anticorrosion | | | | |
| initial | 500 H | 800 H | 700 H | 700 H |
| successive | 400 H | 800 H | 200 H | 700 H |
| Example | 10 | 11 | Comparative 6 | 12 |
| chromate liq. A₁ chromium | lead chromate | calcium chromate 5 g/l ZPC 5 g/l | sodium chromate | zinc potassium chromate (ZPC) |
| Cr conc. | Cr 15 g/l | lead chromate 5 g/l Cr 15 g/l | Cr 15 g/l | Cr 15 g/l |
| A₂ chromium | CrO₃ formalin reduction | CrO₃ formalin reduction | CrO₃ formalin reduction | CrO₃ formalin reduction |
| | Cr 20 g/l | Cr 20 g/l | Cr 20 g/l | Cr 20 g/l |
| Cr⁶⁺/total Cr | 70% | 70% | 70% | 70% |
| B-binder | Aerosil 300 | Aerosil 300 | Aerosil 300 | Snowtex 0 |
| as NV | 15 g/l | 15 g/l | 15 g/l | 15 g/l |
| Evaluation anticorrosion | | | | |
| initial | 600 H | 1000 H | 500 H | 800 H |
| successive | 600 H | 1000 H | 200 H | 800 H |
| Example | 13 | 14 | 15 | 16 | 17 |
| chromate liq. A₁ chromium | ZPC | ZPC | ZPC | ZPC | ZPC |
| Cr conc. | Cr 15 g/l | Cr 15 g/l | Cr 15 g/l | Cr 15 g/l | Cr 15 g/l |
| A₂ chromium | CrO₃ | chromium nitrate | Na bichromate | CrO₃ formalin reduct. | CrO₃ formalin reduct. |
| | Cr 20 g/l | Cr 20 g/l | Cr 20 g/l | Cr 20 g/l | Cr 20 g/l |
| Cr⁶⁺/total Cr | 100% | 0% | 100% | 70% | 70% |
| B-binder | Aerosil 300 | Aerosil 300 | Snowtex N | Aerosil 300 | Aerosil 300 |
| as NV | 15 g/l | 15 g/l | 15 g/l | 15 g/l | 15 g/l |
| Evaluation anticorrosion | | | | | |
| initial | 600 H | 600 H | 600 H | 1000 H | 1200 H |
| successive | 600 H | 600 H | 600 H | 1000 H | 1200 H |

EXAMPLE 18

Zinc potassium chromate having a solubility of 6 to 8 (15g as metallic chromium), polyacrylic acid Jurymer AC-10L (10g as solid) and water (to make the total volume to 1 l) were compounded and subjected to a glass bead dispersion with a paint shaker for 1 hour.

Thus, a metal coating pre-treating agent (pH 2 to 3) was obtained.

TABLE 5

| Example | 18 | 19 | 20 | Comp. 7 |
|---|---|---|---|---|
| metal subst. | zinc electroplated steel sheet | | | |
| metal coating pre-treating agent | | | | |

TABLE 5-continued

| | | | | |
|---|---|---|---|---|
| A₁ chromium compound (Cr g/l) | I (15) I (5) | II (5) I (1) III (5) | II (1) III (1) | — |
| A₂ chromium compound (Cr g/l) Cr⁶⁺/ | — | IV (20) | IV (20) | IV (40) |
| total Cr | — | 70% | 70% | 70% |
| binder | V | VI | VI | VI |
| NV g/l | 10 | 15 | 15 | 30 |
| pH | 2~3 | 2~3 | 2~3 | 2~3 |
| anti-corrosive layer | | | | |
| total Cr | 60 mg/m² | 140 mg/m² | 92 mg/m² | 160 mg/m² |
| A₁ | 60 mg/m² | 60 mg/m² | 12 mg/m² | 0 |
| paint | VIII | VIII | VIII | VIII |
| thickness | 2μ | 2μ | 2μ | 2μ |
| Cr flow-out | | | | |
| initial SST | 500 H | 1000 H | 800 H | 700 H |
| successive SST | 500 H | 1000 H | 800 H | 200 H |

| Example | Comp. 8 | Comp. 9 | 21 |
|---|---|---|---|
| metal subst. | zinc electroplated steel sheet | | |
| metal coating pre-treating agent | | | |
| A₁ chromium compound (Cr g/l) | — | — | I (15) |
| A₂ chromium compound (Cr g/l) Cr⁶⁺/ | IV (40) | IV (40) | |
| total Cr | 70% | 70% | — |
| binder | VI | VI | VII |
| NV g/l | 30 | 30 | 15 |
| pH | 2~3 | 2~3 | 9 |
| anti-corrosive layer | | | |
| total Cr | 160 mg/m² | 160 mg/m² | 60 mg/m² |
| A₁ | 0 | 0 | 60 mg/m² |
| paint | IX | IX | X |
| thickness | 2μ | 2μ | 1μ |
| Cr flow-out | Δ | × | |
| initial SST successive | 700 H | 1000 H | 500 H |

| SST | 200 H | 600 H | 500 H |
|---|---|---|---| anti-SST time up to white rust generation
I zinc potassium chromate (solubility 6~8)
II calcium chromate (solubility 14)
III lead chromate (solubility 10⁻⁴)
IV chromium trioxide (partial reduction)
V polyacrylic acid Jurymer AC-10 L
VI aq. dispersible silica Aerosil 300
VII Snowtex N
VIII urethane modf. epoxy resin clear
IX urethane modif. epoxy containing strontium chromate
X carboxylated polyethylene clear anti-SST time up to white rust generation I. zinc potassium chromate (solubility 6~8) II.calcium chromate (solubility 14) III. lead chromate (solubility 10⁻⁴) IV. chromium trioxide (partial reduction) V . . . polyacrylic acid Jurymer AC-10 L VI . . . aq. dispersible silica Aerosil 300 VII . . . Snowtex N VIII . . . urethane modf. epoxy resin clear IX . . . urethane modif.epoxy containing strontium chromate X . . . carboxylated polyethylene clear

EXAMPLE 22

20 parts of resin (A), which was a copolymer of isobutyl methacrylate and styrene having a weight average molecular weight of 200,000 and containing 10% by weight of benzene rings were dissolved in 66 parts of cyclohexanone. To this, were added 60 parts of Ferrophos HRS 2132 (electrically conductive pigment essentially of di-iron phosphide, manufactured by Hooker Chemicals and Plastics Corp.) and the mixture was subjected to steel bead dispersion in paint shaker for 2 hours.

15 parts of Ceridust 3620 (finely powdered polyethylene wax, manufactured by Hoechst AG.) were added and dispersed well to obtain a coating composition having a non-volatile content of about 60% by weight.

EXAMPLES 23 TO 30 AND COMPARATIVE EXAMPLES 10 TO 13

Using the same procedure as stated in Example 22 but varying the kinds and amounts of resin, electrically conductive pigment, other inorganic pigment and lubricant as shown in Table 6, various coating compositions were prepared.

TABLE 6

| Example | 23 | 24 | 25 | Comp. 10 | Comp. 11 | Comp. 12 |
|---|---|---|---|---|---|---|
| resin | B + C | B + C | B + C | D | B + C | B + C |
| wt ratio | B/C = 8/2 | B/C = 8/2 | B/C = 8/2 | | B/C = 8/2 | B/C = 8/2 |
| benzene ring content | 47% | 47% | 47% | 54% | 47% | 47% |
| amount % | 20 | 12 | 30 | 20 | 40 | 30 |
| elect. cond. pigment | Ferrophos HRS 2132 | Ferrophos HRS 2132 | Ferrophos HRS 2132 | Ferrophos HRS 2132 | Ferrophos HRS 2132 | Ferrophos HRS 2132 |
| amount % | 60 | 65 | 50 | 60 | 40 | 65 |
| polyethylene wax | Ceridust 3620 | Ceridust 3620 | Ceridust 3620 | Ceridust 3620 | Ceridust 3620 | Ceridust 3620 |
| amount % | 15 | 18 | 15 | 15 | 15 | 0 |

| Example | 26 | 27 | 28 | Comp. 13 | 29 | 30 |
|---|---|---|---|---|---|---|
| resin | B + C | B + C | B + C | B + C | B + C | B + C |
| wt ratio | B/C = 8/2 | B/C = 8/2 | B/C = 8/2 | B/C = 8/2 | B/C = 8/2 | B/C = 8/2 |
| benzene ring content | 47% | 47% | 47% | 47% | 47% | 47% |
| amount % | 20 | 20 | 20 | 60 | 20 | 20 |
| elect. cond. pigment | Ferrophos HRS 2132 | Ferrophos HRS 2132 | Ferrophos HRS 2132 | Ferrophos HRS 2132 | Ferrophos 2132 (30 wt %) Zn powd (30 wt %) | Ferrophos 2132 (30 wt %) Zn powd (30 wt %) |
| amount % | 50 | 65 | 30 | 25 | 60 | 60 |
| polyethylene wax | Ceridust 3620 | Ceridust 3620 | Ceridust 3620 | Ceridust 3620 | Ceridust 3620 | butyl stearate |

TABLE 6-continued

| amount % | 25 | 15 | 15 | 15 | 15 | 15 |
|---|---|---|---|---|---|---|

Incidentally, in Table 6, the materials used were
resin B: urethane modified epoxy resin (Example 3 of Japanese Patent Application Kokai No. 30717/82), benzene ring content being 45 wt % resin C: resol type phenol resin (Showa Union Gosei K.K., BKS-316), benzene ring content being 55 wt % resin D: epoxy resin (Epo-tohto D-014, epoxy equivalent 950, manufactured by ToTo Kaseisha), benzene ring content being 54 wt %

Zinc Powder: manufactured by Mitsui Kinzoku Kogyo K.K., coating use zinc powder

Zinc nickel alloy electroplated steel plate (40 g/m²) was treated with alkali-degreasing agent, washed with water and dried, and then it was coated with a chromate solution by a roll-coater so as to give chromium adhered amount of 200 mg/m², and dried to obtain a pretreated sheel plate. As the chromate solution, use was made of the solution prepared by reducing an aqueous chromium trioxide solution with formalin, thereby obtaining a solution containing 20 g/l of total chromium ($Cr^{6+}/Cr^{3+} = 7/3$), adding aerosil 300 (fumed silica, manufactured by Nihon Aerosil Co.) in an amount of 15 g/l, and subjecting to a glass bead dispersion in a paint shaker for 1 hour.

To the abovesaid steel plate, the coating compositions (solid 60%) obtained in Examples 22 to 30 and Comparative Examples 10 to 13 were each applied by a roll-coater, to give a dry thickness of 5μ, baked in a direct hot gas furnace at the maximum plate temperature of 200° C. for 60 seconds and allowed to cool to obtain a test specimen. With these test specimens, the following tests were carried out.

Continuous spot-weldability:
Under the conditions of electrode diameter 5 mm, pressure 200 Kg, charged times 10 cycles, and electric current 8000A, spotweldings were carried out and the number of continuously welded spots was determined.

Evaluation:
⊙ : more than 5000 spots, no contamination of electrode
○ : more than 5000 spots, considerable contamination of electrode
Δ : 3000 to 5000 spots
X : less than 3000 spots The test results are shown in Table 7.

TABLE 7

| | Continuous spot-weldability |
|---|---|
| Example 22 | ⊙ |
| 23 | ⊙ |

TABLE 7-continued

| | Continuous spot-weldability |
|---|---|
| 24 | ⊙ |
| 25 | ⊙ |
| 26 | ⊙ |
| 27 | ○ |
| 28 | ⊙ |
| 29 | ⊙ |
| 30 | ⊙ |
| Comp. Ex. 10 | X |
| 11 | X |
| 12 | X |
| 13 | X |

Satisfactory processability and anti-corrosive property were obtained with each specimen prepared by using the compositions of Examples 22 to 30, but poor processabilities were obtained with those of Comparative Examples 12 and 13.

EXAMPLE 31

Urethane modified epoxy resin B (manufactured by the method of Example 3 of Japanese Patent Application Kokai No. 30717/82, benzene ring content 45% by weight) and resol type phenol resin C (Showa Union Gosei K.K., BKS 316, benzene ring content 55% by weight) were mixed in 8/2 ratio to obtain mixed resin (average benzene ring content 47% by weight).

20 parts of said mixed resin were dissolved in 66 parts of cyclohexanone and to this solution, were added 60 parts of Ferrophos HRS 2132 (electrically conductive pigment essentially of di-iron phosphide, manufactured by Hooker Chem. and Plastics Corp.) and 5 parts of strontium chromate N (chromate pigment, aqueous suspenson pH 8 to 9, manufactured by Kikuchi Shikiso K.K.) and the mixture was subjected to a steel bead dispersion in a paint shaker for 2 hours. Thereafter, 15 parts of Ceridust 3620 (finely pulverized polyethylene wax, manufactured by Hoechst AG.) were added and mixed uniformly by using Disper to obtain a coating composition having a non-volatile content of 65% by weight.

EXAMPLES 32 TO 36 AND COMPARATIVE EXAMPLES 14 TO 16

Using the same method as stated in Example 31, but changing the kinds and amounts of resin, electrically conductive pigment, iron phosphide decomposition inhibitor and polyethylene wax as given in the following Table 8, various coating compositions were obtained.

TABLE 8

| Example | 32 | 33 | 34 | 35 |
|---|---|---|---|---|
| resin | B + C | B + C | B + C | B + C |
| wt ratio | (B/C = 8/2) | (B/C = 8/2) | (B/C = 8/2) | (B/C = 8/2) |
| average benzene ring content (wt %) | 47 | 47 | 47 | 47 |
| amount (wt %) | 20 | 20 | 20 | 20 |
| elec. conductive pigment | Ferrophos HRS 2132 | Ferrophos HRS 2132 | Ferrophos HRS 2132 | Ferrophos HRS 2132 |
| amount (wt %) | 60 | 35 | 30 | 55 |
| polyethylene wax | Ceridust 3620 | Ceridust 3620 | Ceridust 3620 | Ceridust 3620 |
| amount (wt %) | 15 | 15 | 15 | 15 |
| decomp. inhibitor pH of aq. suspens. | SACI 700 (8.5~9.5) | Imsil A-108 (6.5~7.5) | strontium chromate N 5 Sicor ZmP/S | strontium chromate N 5 SACI 700 |

TABLE 8-continued

| amount (wt %) | 5 | 30 | 30 | 5 |
|---|---|---|---|---|
| total pigment (wt %) | 65 | 65 | 65 | 65 |

| Example | 36 | Comp. Ex. 14 | Comp. Ex. 15 | Comp. Ex. 16 |
|---|---|---|---|---|
| resin | B + C | B + C | B + C | B + C |
| wt ratio | (B/C = 8/2) | (B/C = 8/2) | (B/C = 8/2) | (B/C = 8/2) |
| average benzene ring content (wt %) | 47 | 47 | 47 | 47 |
| amount (wt %) | 20 | 20 | 20 | 20 |
| elec. conductive pigment | Ferrophos HRS 2132 | Zn Powder | Ferrophos HRS 2132 | Ferrophos HRS 2132 |
| amount (wt %) | 30 | 65 | 65 | 60 |
| polyethylene wax | Ceridust 3620 | Ceridust 3620 | Ceridust 3620 | Ceridust 3620 |
| amount (wt %) | 15 | 15 | 15 | 15 |
| decomp. inhibitor pH of aq. suspens. | strontium chromate N 5 Zn powder | | | VULCAN XC-72R (4.5~5.5) |
| amount (wt %) | 30 | | | 5 |
| total pigment (wt %) | 65 | 65 | 65 | 65 |

Incidentally, in this Table 8, the materials used were

Imsil A-108:
amorphous soft silica, manufactured by Illinois Minerals Co.

Zinc powder:
coating use zinc powder, manufactured by Mitsui Kinzoku Kogyo K.K.

SACI 700:
mixture of calcium salt of petroleum sulfonate and calcium carbonate, manufactured by Witco Co.

Sicor Z mp/S:
zinc phosphate pigment, manufactured by BASF

Vulcan XC-72R:
carbon black, manufactured by Cabot Co.

Zinc nickel alloy electroplated steel sheet (40 g/m$^2$) was alkalidegreased, washed with water, dried, and then coated by means of a roll-coater with a chromate solution so as to give a chromium adhered amount of 200 mg/m$^2$, and dried to obtain a pre-treated steel sheet.

As the chromate solution, use was made of the solution obtained by reducing an aqueous chromium trioxide solution with formalin thereby forming the solution containing total chromium of 20 g/l consisting of $Cr^{6+}/Cr^{3+} = 7/3$, adding aerosil 300 (fumed silica, manufactured by Nihon Aerosil Co.) in an amount of 15 g/l, and subjecting to a glass bead suspension in a paint shaker for 1 hour. To thus prepared steel sheet, the coating compositions obtained in each Example and Comparative Example were applied by roll-coater in a dry thickness of 5μ, respectively, and baked in a direct hot gas furnace at the maximum plate temperature of 200° C. for 60 seconds to obtain the test specimens.

The following tests were carried out with these specimens.

1. Continuous spot-weldability

Under the conditions of electrode diameter 5 mm, pressure 200 Kg, charged times 10 cycles, and electric current 8000A, spotweldings were carried out and the number of continously welded spots was determined.
Evaluation:
⊚ : more than 5000 spots, no contamination of electrode
○ : more than 5000 spots, considerable contamination of electrode
Δ : 3000 to 5000 spots
X : less than 3000 spots

2. Processability

Using a cylinderical cup drawing test apparatus (Model B1-142, manufactured by Erichsen Co.), the test specimen was processed under the conditions:
sheet holder pressure 3 tons,
punch diameter: 50 mm φ
dies diameter: 52.4 mm φ
draw depth: 40 mm
blank diameter: 95 mm
and film defect and peeling were examined.
Evaluation:
⊚ : no abnormality in coating
○ : less than 10% film defects (not reached to substrate metal)
Δ : many film defects, some of the defects being reached to the substrate metal
X : cracks of substrate plate

3. ANTI-CORROSIVE PROPERTY (a) Composite anti-corrosion test 1 cycle=salt spraying (5% Nacl, 35° C.) for 2 hours, drying (60° C.) for 2 hours, and wetting (98% RH, 50° C.) for 4 hours After repeating 200 cycles, generations of red rust and white rust on flat portion were examined.
⊚ : no generation of white and red rusts
○ : white rust generated area less than 5% no generation of red rusts
Δ : white rust generated area more than 6% no generation of red rusts
X : red rust generated area more than 1%

(b) salt spraying test (JIS-Z 2371)

After 2000 hours salt spraying, generations of red rust and of white rust on flat portion were examined.
Evaluation:
⊚ : no generation of both white and red rusts
○ : white rust generated area less than 5% no generation of red rust
Δ : white rust generated area more than 6% no generation of red rust
X : red rust generated area more than 1%
The test results are shown in Table 9.

TABLE 9

|  | contin. spot weldability | cylindrical cup draw processabil. | composit anti-corros. test | salt spray anti-corros. |
|---|---|---|---|---|
| Example 31 | ◯ | ◯ | ◯ | ◯ |
| 32 | ◯ | ◯ | ◯ | ◯ |
| 33 | ◯ | ◯ | ◯ | ◯ |
| 34 | ◯ | ◯ | ◯ | ◯ |
| 35 | ◯ | ◯ | ◯ | ◯ |
| 36 | ◯ | ◯ | ◯ | ◯ |
| Comp. Ex. 14 | ◯ | ◯ | X | △ |
| 15 | ◯ | ◯ | X | ◯ |
| 16 | ◯ | ◯ | X | △ |

EXAMPLE 37

Zinc nickel alloy electroplated steel sheet was coated by rollcoat method with the following chromate liquid, dried in a gas furnace for 1 min. (maximum plate temperature 150° C.) to obtain a chromate coating (60 mg/m² chromium coverage).

As the chromate liquid, use was made of the solution obtained by mixing zinc potassium chromate having a solubility of 6 to 8 (15 g as metallic chromium), polyacrylic acid (Jurymer AC-10L, manufactured by Nihon Junyaku K.K.) (10 g as solid) and water (to make the total volume to 1 l), and subjecting to a glass bead dispersion in a paint shaker for 1 hour.

Separately, the following coating composition was prepared. 16 parts by weight (as solid) of urethane modified epoxy resin (prepared by the method of Example 3 of Janpanese Patent Application Kokai No. 30717/82, benzene ring content being 45 wt %) and 4 parts by weight (as solid) of resol type phenol resin (BKS-316, manufactured by Showa Union Gosei K.K., benzene ring content being 55 wt %) were dissolved in cyclohexanone. To this, were added 60 parts by weight of Ferrophos HRS 2132 (electrically conductive pigment essentially of di-iron phosphide, manufactured by Hooker Chemicals and Plastics Co.) and 5 parts by weight of strontium chromate N (chromate pigment, iron phophide decomposition inhibitor, manufactured by Kikuchi Shikiso K.K.) and the mixture was subjected to a steel bead dispersion in a paint shaker for 2 hours. The dispersion was filtered, added with 15 parts by weight of Ceridust 3620 (finely pulverized polyethylene wax, manufactured by Hoechst AG), uniformly mixed in Disper and adjusted to non-volatile content 60 wt % by cyclohexanone.

To the abovesaid chromated steel sheet was applied the said coating composition by roll-coat technique and baked in a gas furnace (maximum plate temperature 200° C.) for 1 minute, thereby obtaining an anti-corrosive coated laminate having a paint layer of 7µ thickness.

EXAMPLES 38 TO 43 AND COMPARATIVE EXAMPLES 17 TO 20

Using the same method as stated in Example 37 but varying the metal substrates, compositions of anti-corrosive layers and paint compositions as given in Table 10, various coated laminates were prepared.

The chromate treating liquid containing water soluble chromium compound having a solubility of more than 20 used in Example 38, was prepared as follows:

Chromium trioxide (20 g as metallic chromium) was dissolved in 500 ml of water and the solution was added with formalin, thereby reducing 40% of the total chromium contained to $Cr^3$ to obtain a partially reduced chromic acid aqueous solution. Next, 15 g of Aerosil 300 (fumed silica, manufactured by Nihon Aerosil K.K.) and zinc potassium chromate having a solubility of 6 to 8 (15 g as metallic chromium) and water (in an amount enough to make the total volume to 1 l) were added and the mixture was subjected to a glass bead dispersion in a paint shaker for 1 hour.

Continuous spot-weldability, processability and anti-corrosive property of the respective laminate were evaluated and the test results were shown in Table 11.

TABLE 10

| Example | 38 | 39 | 40 |
|---|---|---|---|
| substrate material | Zn/Ni alloy elect. plated | Zn/Ni alloy elect. plated | chromated, Zn/Ni alloy ele. pl. |
| Cr compound | ZPC | ZPC 5 | ZPC 5 |
| $A_1$ (g Cr/l) | (15) part. reduct. | Pb chromate 5 Ca chromate 5 | Pb chromate 5 Ca chromate 5 |
| $A_2$ (g Cr/l) | $CrO_3$ (20) | part. reduct. $CrO_3$ 20 | part. reduct. $CrO_3$ 20 |
| binder (NV g/l) | Aerosil 300 15 | Aerosil 300 15 | Aerosil 300 15 |
| Cr content mg/m² | $A_1$ 60 | $A_1$ 60 | $A_1$ 60 |
| anti-cor. layer | $A_1 + A_2$ 140 | $A_1 + A_2$ 140 | $A_1 + A_2$ 140 |
| resin | B + C B/C = 8/2 | B + C B/C = 8/2 | B + C B/C = 8/2 |
| benzene ring content wt % | 47 | 47 | 47 |
| amount wt % | 20 | 20 | 20 |
| elect. cond. pigment | Ferrophos HRS 2132 | Ferrophos HRS 2132 | Ferrophos HRS 2132 |
| amount wt % | 60 | 60 | 60 |
| polyethylene wax | Ceridust 3620 | Ceridust 3620 | Ceridust 3620 |
| amount wt % | 15 | 15 | 15 |
| iron phosphide decomp. inhibit. | strontium chromate N | strontium chromate N | strontium chromate N |
| amount wt % | 5 | 5 | 5 |
| total pig. wt % | 65 | 65 | 65 |
| film thick. µ | 7 | 7 | 7 |
| Example | Comp. Ex. 17 | 41 | 42 |
| substrate material | Zn/Ni alloy elect. plated | Zn/Ni alloy elect. plated | Zn/Ni alloy elect. plated |
| Cr compound | | ZPC | ZPC |

TABLE 10-continued

| | | | |
|---|---|---|---|
| $A_1$ (g Cr/l) | no part. reduct. | 15 | 15 |
| $A_2$ (g Cr/l) | $CrO_3$ 40 | part. reduct. $CrO_3$ 20 | part. reduct. $CrO_3$ 20 |
| binder (NV g/l) | Aerosil 300 15 | Aerosil 300 15 | Aerosil 300 15 |
| Cr content (mg/m$^2$) | $A_2$ 160 | $A_1$ 60 $A_1 + A_2$ 140 | $A_1$ 60 $A_1 + A_2$ 140 |
| resin | B + C B/C = 8/2 | B + C B/C = 8/2 | B + C B/C = 8/2 |
| benzene ring content wt % | 47 | 47 | 47 |
| amount wt % | 20 | 20 | 15 |
| elect. cond. pigment | Ferrophos HRS 2132 | Ferrophos HRS 2132 | Zn powder |
| amount wt % | 60 | 60 | 75 |
| polyethylene wax | Ceridust 3620 | Ceridust 3620 | Ceridust 3620 |
| amount wt % | 15 | 15 | 10 |
| iron phosphide decomp. inhibit. | strontium chromate N | strontium chromate N | strontium chromate N |
| amount wt % | 5 | 5 | 0 |
| total pig. wt % | 65 | 65 | 75 |
| film thick. μ | 7 | 15 | 7 |

| Example | 43 | Comp. Ex. 18 | Comp. Ex. 19 |
|---|---|---|---|
| substrate material | Zn/Ni alloy elect. plated | Zn/Ni alloy elect. plated | Zn/Ni alloy elect. plated |
| Cr compound | ZPC | ZPC | ZPC |
| $A_1$ (g Cr/l) | 15 | 15 | 15 |
| $A_2$ (g Cr/l) | part. reduct. $CrO_3$ 20 | part. reduct. $CrO_3$ 20 | part. reduct. $CrO_3$ 20 |
| binder (NV g/l) | Aerosil 300 15 | Aerosil 300 15 | Aerosil 300 15 |
| Cr content (mg/m$^2$) | $A_1$ 60 $A_1 + A_2$ 140 | $A_1$ 60 $A_1 + A_2$ 140 | $A_1$ 60 $A_1 + A_2$ 140 |
| resin | B + C B/C = 8/2 | B + C B/C = 8/2 | B + C B/C = 8/2 |
| benzene ring content wt % | 47 | 47 | 47 |
| amount wt % | 20 | 24 | 15 |
| elect. cond. pigment | Ferrophos HRS 2132 | Ferrophos HRS 2132 | Ferrophos HRS 2132 |
| amount wt % | 30 | 70 | 10 |
| polyethylene wax | Ceridust 3620 | Ceridust 3620 | Ceridust 3620 |
| amount wt % | 15 | 1 | 15 |
| iron phosphide decomp. inhibit. | St chrom. 5 wt % ImsilA-108 30% | strontium chromate N | St chrom. 5 wt % ImsilA-108 50% |
| amount wt % | 35 | 5 | 55 |
| total pig. wt % | 65 | 75 | 75 |
| film thick. μ | 7 | 7 | 7 |

| | Example | Comp. Ex. 20 |
|---|---|---|
| substrate material | | Zn/Ni alloy elect. plated |
| Cr compound | | ZPC |
| $A_1$ (g Cr/l) | | 15 |
| $A_2$ (g Cr/l) | | part. reduct. $CrO_3$ 20 |
| binder (NV g/l) | | Aerosil 300 15 |
| Cr content (mg/m$^2$) | | $A_1$ 60 $A_1 + A_2$ 140 |
| resin | | D + C D/C = 9/1 |
| benzene ring content wt % | | 54 |
| amount wt % | | 20 |
| elect. cond. pigment | | Ferrophos HRS 2132 |
| amount wt % | | 60 |
| polyethylene wax | | Ceridust 3620 |
| amount wt % | | 15 |
| iron phosphide decomp. inhibit. | | Strontium chromate N |
| amount wt % | | 5 |
| total pig. wt % | | 65 |

TABLE 10-continued

| film thick. μ | 7 |
|---|---|

TABLE 11

| | contin. spot weldability | cylindrical cup draw processabil. | salt spray anti-corros. 2500H | comp. corro. 200 cycles A | B* |
|---|---|---|---|---|---|
| Example 37 | ◯ | ◯ | ◯ | ◯ | ◯ |
| 38 | ◯ | ◯ | ◯ | ◯ | ◯ |
| 39 | ◯ | ◯ | ◯ | ◯ | ◯ |
| 40 | ◯ | ◯ | ◯ | ◯ | ◯ |
| 41 | ◯ | ◯ | ◯ | ◯ | ◯ |
| 42 | ◯ | ◯ | △ | ◯ | ◯ |
| 43 | ◯ | ◯ | ◯ | ◯ | ◯ |
| Comp. Ex. 17 | ◯ | ◯ | ◯ | ◯ | X |
| 18 | X | X | ◯ | ◯ | ◯ |
| 19 | X | ◯ | ◯ | ◯ | ◯ |
| 20 | X | ◯ | ◯ | ◯ | ◯ |

A after 1 week from coating
B after 2 months from coating

A ... after 1 week from coating
B ... after 2 months from coating

What is claimed is:

1. An anti-corrosive, coated laminate comprising a metal substrate, an anti-corrosive layer coated on the metal substrate and formed by using a composition containing, as essential components, at least one hexa-valent chromium containing chromium compound having a solubility of 20 to $10^{-5}$ and a binder material selected from the group consisting of an aqueous silica and an aqueous resin, and an electrically conductive paint layer formed on said anti-corrosive layer, wherein said paint layer is formed by using a coating composition comprising, as solid,
   (A) 10 to 35% by weight of at least one binder resin whose aromatic ring content in its molecule is less than 50% by weight and which is selected from the group consisting of epoxy resin, alkyd resin, acryl resin, melamine resin, urethane resin, phenol resin, vinyl resin, polyvinyl butyral resin, polyvinyl acetate resin, chlorinated rubber, oil-free polyester resin, phthalic acid resin, styrene resin and polyolefin resin,
   (B) 4 to 50% by weight of polyethylene wax capable of being decomposed exothermically at 300° to 500° C., and
   (C) 15 to 86% by weight of electrically conductive pigment having a mean diameter of less than 20 microns, which is selected from the group consisting of stainless steel, gold, silver, cadmium, aluminum, zinc, tin, copper and graphite powders; iron, nickel, titanium, tungsten, niobium and manganese carbides; and ferromanganese, ferromolybdenum, ferrosilicon, ferrochromium, ferrotitanium and ferrosphosphorous ferroalloys.

2. The laminate according to claim 1 wherein the paint layer has a thickness of 1 to 20μ.

3. The laminate according to claim 1, wherein the metal substrate is previously treated with an anti-corrosive chemical pre-treatment composition.

4. The laminate according to claim 1, wherein the composition for the anti-corrosive layer further contains a water soluble chromium compound having a solubility of more than 20.

5. The laminate according to claim 1 wherein the metal substrate is selected from steel, zinc or aluminum plate, or nickel or iron-containing zinc electro-plated steel plate.

6. The laminate according to claim 1 wherein the anti-corrosive layer contains chromium compounds in an amount of 0.01 to 1g/m² as metallic chromium.

7. The laminate according to claim 1 wherein the anti-corrosive layer contains hexa-valent chromium in an amount of 10 to 90% by weight of the total water soluble chromium.

8. The laminate according to claim 1 wherein the polyethylene wax is in the form of powder having a mean diameter of less than 50 microns, the molecular weight of the polyethylene being in the range of 1,000 to 10,000.

9. The laminate according to claim 8 wherein the polyethylene has a specific gravity of at least 0.94 and an acidity of not more than 15 KOH mg/g.

10. An anti-corrosive, coated laminate comprising a metal substrate, an anti-corrosive layer coated on the metal substrate and formed by using a composition containing, as essential components, at least one hexavalent chromium containing chromium compound having a solubility of 20 to $10^{-5}$ and a binder material selected from the group consisting of an aqueous silica and an aqueous resin, and an electrically conductive paint layer formed on said anti-corrosive layer, wherein said paint layer is formed by using a coating composition comprising, as solid,
   (A) 10 to 35% by weight of at least one binder resin whose aromatic ring content in its molecule is less than 50% by weight and which is selected from the group consisting of epoxy resin, alkyd resin, acryl resin, melamine resin, urethane resin, phenol resin, vinyl resin, polyvinyl butyral resin, polyvinyl acetate resin, chlorinated rubber, oil-free polyester resin, phthalic acid resin, styrene resin and polyolefin resin,
   (B) 4 to 30% by weight of polyethylene wax capable of being decomposed exothermically at 300° to 500° C.,
   (C) 15 and 85% by weight of electrically conductive pigment which is essentially of di-iron phosphide and has a mean diameter of less than 20 microns,
   (D) 1 to 71% by weight of iron phosphide decomposition inhibitor whose aqueous suspension has a pH of 6 and 13 and which is selected from the group consisting of alkaline earth metal petroleum sulfonates, zinc chromate, zinc potassium chromate, lead chromate, basic lead chromate, calcium chromate, strontium chromate, zinc phosphate, iron phosphate, aluminum tripolyphosphate, lead silicate, talc, calcium carbonate, silica and zinc powder wherein the amount of zinc powder is less than the iron phosphide amount, and
   (E) 0 to 70% by weight of other inorganic pigment selected from the group consisting of zinc chromate, lead chromate, calcium chromate, strontium chromate, zinc phosphate, iron phosphate, aluminium tripolyphosphate, lead silicate, silica, calcium carbonate, talc, alumina, chromium oxide, iron oxide and lead oxide, provided that the total amount of (C), (D) and (E) is 35 to 86% by weight of the total solids of the composition.

11. The laminate according to claim 10 wherein the metal substrate is previously treated with an anti-corrosive chemical pre-treatment composition.

12. The laminate according to claim 10 wherein the composition for the anti-corrosive layer further contains a water soluble chromium compound having a solubility of more than 20.

13. The laminate according to claim 10 wherein the metal substrate is selected from steel, zinc or aluminum plate, or nickel or iron-containing zinc electro-plated steel plate.

14. The laminate according to claim 10 wherein the anti-corrosive layer contains chromium compounds in an amount of 0.01 to 1g/m$^2$ as metallic chromium.

15. The laminate according to claim 10 wherein the anti-corrosive layer contains hexa-valent chromium in an amount of 10 to 90% by weight of the total water soluble chromium.

16. The laminate according to claim 10 wherein the paint layer has a thickness of 1 to 20μ.

17. The laminate according to claim 10 wherein the polyethylene wax is in the form of powder having a mean diameter of less than 50 microns, the molecular weight of the polyethylene being in the range of 1,000 to 10,000.

18. The laminate according to claim 10 wherein the total amount of (C), (D) and (E) is 35 to 70% by weight of the total solids of the composition.

* * * * *